L. Swift.
Revolving Rake.
Nº 4933. Patented Jan. 19, 1847.
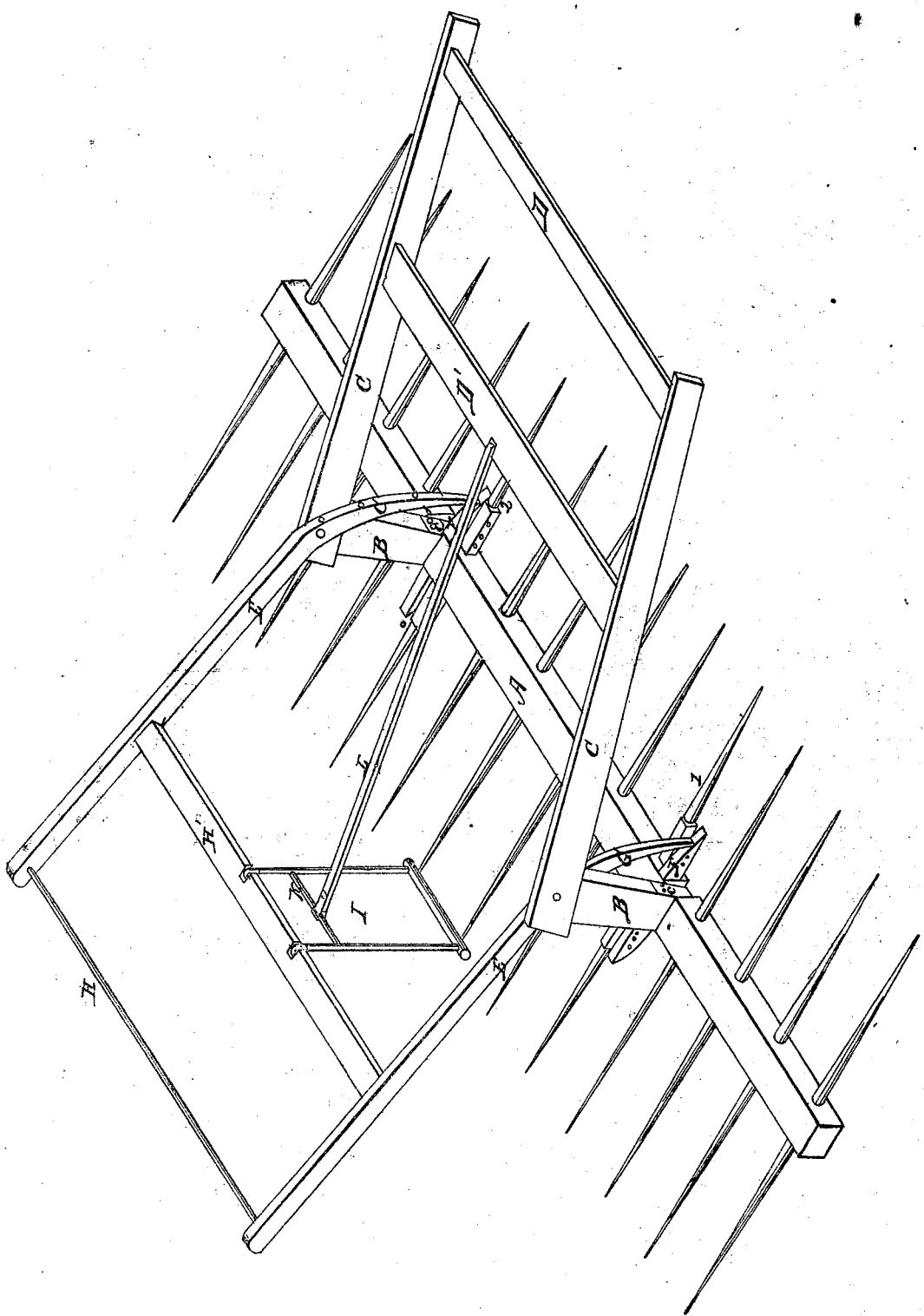

UNITED STATES PATENT OFFICE.

LEWIS SWIFT, OF CLARKSON, NEW YORK.

IMPROVEMENT IN HORSE-RAKES.

Specification forming part of Letters Patent No. 4,933, dated January 19, 1847.

*To all whom it may concern:*

Be it known that I, LEWIS SWIFT, of Clarkson, in the county of Monroe and State of New York, have invented a new and useful Improvement in Horse-Rakes; and I do hereby declare that the following is a full, clear, and exact description of the construction and operation of the same, reference being had to the accompanying drawing, making a part of this specification, which is an isometrical view of the same.

To enable others skilled in the art to make and use my invention, I will proceed to describe the construction and operation.

Through a piece of timber of suitable dimensions, which is to form the head of the rake, I bore or mortise holes to suit the required number of teeth, the teeth to be sharpened at both ends and inserted in the head of the rake, so that they will form a double range. Between the ends of the head A of the rake, at any suitable distance, are to be placed uprights B B, working on the head by collars fitting sufficiently loose as to allow them to turn easily on it. On the top of these uprights, secured in a durable manner, are to be placed two beams, C C, extending in front and strengthened by two cross-pieces, D D, the whole forming a frame to which the shafts are to be attached, and by which the rake is drawn. Near the top of the uprights, and to them, are secured handles E E in any manner that will allow them to vibrate when required. On the inside of the uprights, and against two of the teeth, 1 and 2, which are left square for that purpose, are secured in a firm manner blocks F F, the ends of which are somewhat rounded or elliptical, the ends G G of the handles, near the uprights, to be curved, the curve to be about the quarter of a circle, and the diameter of which to be equal to about one-half of the length of the blocks, the other ends of the handles to be connected by cross-pieces H H'. From the cross-piece H' is suspended a frame, I, the bottom rail of which rests on the rear range of the teeth. From a cross-piece, K, in this frame is a rod, L, connecting with the cross-piece D' in the shaft-frame hereinbefore described.

The rake is operated by pressing down the handles, which causes the frame I to come in contact with the teeth and keeps them in a horizontal position. When the hay accumulated in the rake is to be thrown off, the handles are elevated, which causes the frame I to glide off the teeth, thus allowing the rake to revolve. When the rake passes the center of gravity the handles must be raised, which causes the inside of the curved part of the handles to come in contact with the points of the blocks, thus placing in the power of the opertor control over the rake, so that he can let it down gradually by means of the blocks bearing against the inside of the curved part of the handles, thereby preventing the sudden fall of the rake, so that no hay will be carried forward to the next windrow, which the ordinary rake will always do when the hay is large.

What I claim, and desire to secure by Letters Patent, is—

The curve in the handles, in combination with the blocks affixed to the teeth, in the manner and for the purpose herein set forth.

In witness whereof I have hereunto set my hand this 18th day of June in the year of our Lord 1845.

LEWIS SWIFT.

Witnesses:
JOEL PALMER,
ALBERT H. PALMER.